United States Patent
Dietachmayr

(10) Patent No.: US 9,327,478 B2
(45) Date of Patent: May 3, 2016

(54) APPARATUS FOR LAYING FIBER TAPES

(71) Applicant: GFM—GmbH, Steyr (AT)

(72) Inventor: Harald Dietachmayr, Sieming (AT)

(73) Assignee: GFM—GmbH, Steyr (AT)

( * ) Notice: Subject to any disclaimer, the term of this patent is extended or adjusted under 35 U.S.C. 154(b) by 16 days.

(21) Appl. No.: 14/538,881

(22) Filed: Nov. 12, 2014

(65) Prior Publication Data
US 2015/0165738 A1   Jun. 18, 2015

(30) Foreign Application Priority Data
Dec. 16, 2013   (AT) ............... A 50830/2013

(51) Int. Cl.
B29C 70/38   (2006.01)
B32B 37/00   (2006.01)
B32B 37/12   (2006.01)
B32B 37/10   (2006.01)

(52) U.S. Cl.
CPC ........... *B32B 37/0053* (2013.01); *B29C 70/388* (2013.01); *B32B 37/10* (2013.01); *B32B 37/12* (2013.01); *B32B 2305/28* (2013.01); *B32B 2405/00* (2013.01)

(58) Field of Classification Search
CPC ..................... B29C 70/388; B29C 70/384
See application file for complete search history.

(56) References Cited

U.S. PATENT DOCUMENTS

| | | | |
|---|---|---|---|
| 4,351,688 A | | 9/1982 | Weiss et al. |
| 4,750,965 A | * | 6/1988 | Pippel .................. B29C 70/388 156/361 |
| 4,869,774 A | * | 9/1989 | Wisbey .................. B29C 70/32 156/486 |
| 4,954,204 A | * | 9/1990 | Grimshaw ............ B29C 70/388 156/361 |
| 5,011,563 A | * | 4/1991 | Shinno ................. B29C 70/388 156/353 |
| 5,058,497 A | * | 10/1991 | Bishop ................ B29C 63/0004 100/155 R |
| 5,314,563 A | * | 5/1994 | Grimshaw ............ B29C 70/388 156/358 |
| 5,316,612 A | * | 5/1994 | Peterson ............... B29C 70/388 156/358 |
| 5,352,306 A | | 10/1994 | Grimshaw et al. |
| 5,454,897 A | * | 10/1995 | Vaniglia ................. B29C 70/32 156/166 |
| 5,989,384 A | * | 11/1999 | Grimshaw ............ B29C 70/388 156/312 |
| 8,042,594 B2 | * | 10/2011 | Miller ................... B29C 70/382 156/358 |
| 2007/0044922 A1 | * | 3/2007 | Mischler ............... B29C 70/382 156/574 |

FOREIGN PATENT DOCUMENTS

DE   27 53 272 A1   5/1979
EP   0 371 289 A1   6/1990

* cited by examiner

Primary Examiner — Jeff Aftergut
(74) Attorney, Agent, or Firm — Collard & Roe, P.C.

(57) ABSTRACT

An apparatus for laying fiber tapes includes a deflection guide for the fiber tapes made up of pressure plates arranged adjacent to one another transversely to the deflection axis and a frame for receiving the pressure plates which is displaceable in the laying direction. Pressure plates with rollers for deflecting the tape are provided between the pressure plates with a sliding surface for the deflection of the tape, and the retainers for the rollers, which retainers are arranged laterally on the pressure plates, displaceably engage in the pressing direction in recesses of the pressure plates with the sliding surfaces.

6 Claims, 4 Drawing Sheets

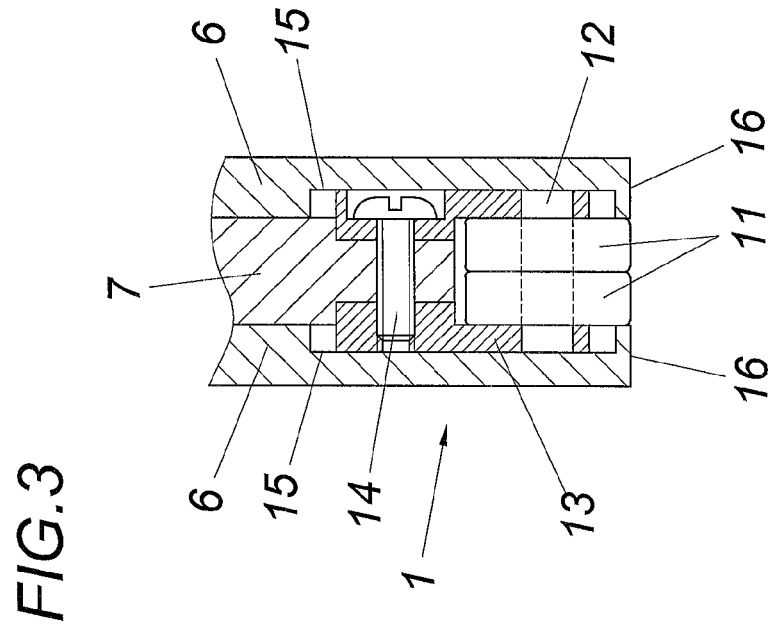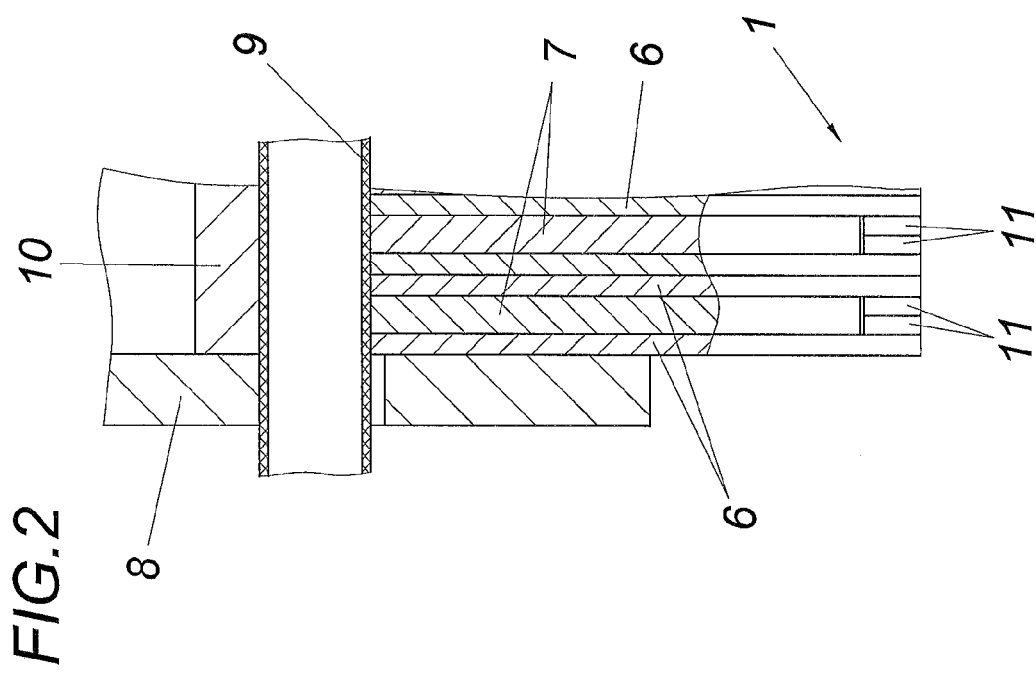

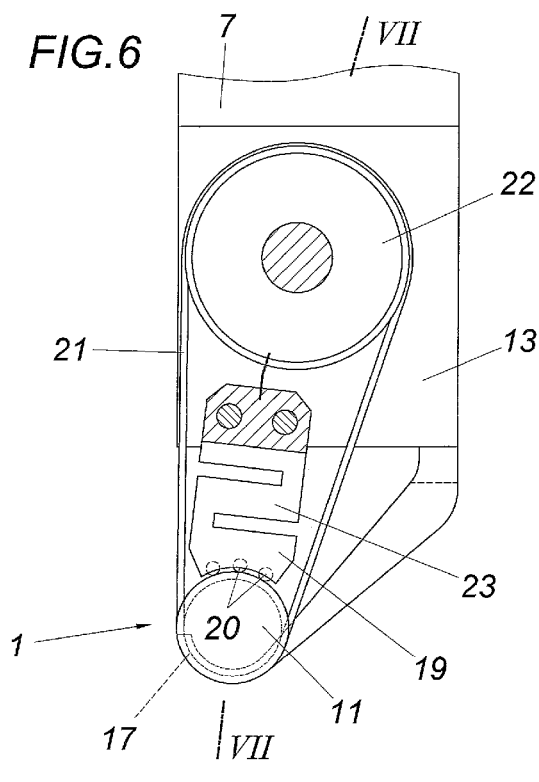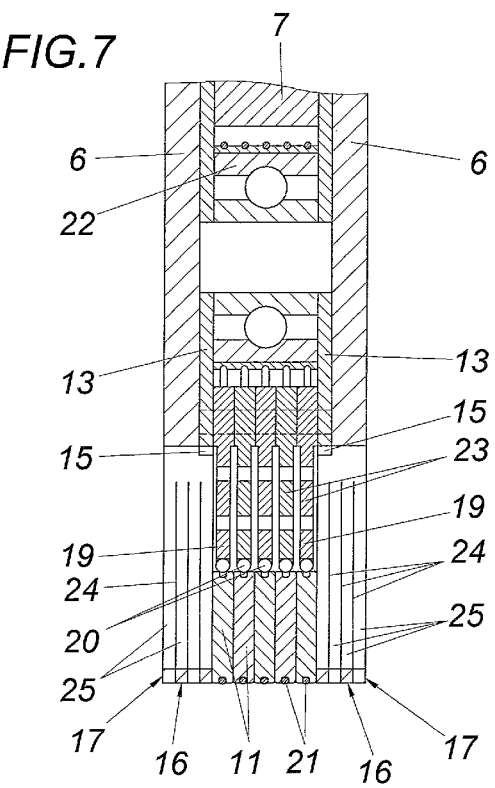

APPARATUS FOR LAYING FIBER TAPES

CROSS REFERENCE TO RELATED APPLICATIONS

Applicant claims priority under 35 U.S.C. §119 of Austrian Application No. A50830/2013 filed Dec. 16, 2013, the disclosure of which is incorporated by reference.

FIELD OF THE INVENTION

The invention relates to an apparatus for laying fiber tapes, comprising a deflection guide for the fiber tapes consisting of pressure plates arranged adjacent to one another transversely to the deflection axis and a frame for receiving the pressure plates which is displaceable in the laying direction.

DESCRIPTION OF THE PRIOR ART

Laying heads with a deflection guide for the fiber tapes are usually used for producing fiber structures, which laying heads are pressed against the already laid fiber layers by means of the adjacently arranged pressure plates which form the deflection guide. The fiber tapes, which comprise an adhesive tape carrying a fiber layer, are drawn off a supply roll to the extent of the forward feed movement of the laying head and are supplied to the deflection guide in order to press the fiber layer to the already laid fiber layers on the one hand and to draw off the adhesive tape from the fiber layer on the other hand, which requires a comparatively small deflection radius. Since the individual fiber layers of the fiber structure are to be placed tightly on each other with no trapped air in between, a respective pressurization of the fiber tapes by the deflection guide must be ensured. It is known for this purpose (EP 0 371 289 B1) to mount the pressure plates arranged in an assembly next to one another in a displaceable manner independently of each other in the pressing direction in a frame and to apply pressure to the same by a membrane, so that the individual pressure plates are also able to follow an uneven progression of the already laid fiber layers as a result of the flexibility of the membrane.

In order to reduce the friction produced during pressing of the fiber tapes against the already laid fiber layers between the pressure plates and the adhesive tape of the fiber tapes, it is further known (U.S. Pat. No. 4,351,688 A, US 2007/044 922 A1) to replace the pressure plates by pressure rings which are rotatably mounted on the bearing discs which are displaceably guided in the pressing direction. Irrespective of whether the pressure rings mounted on the resiliently supported bearing discs are respectively pressurized via pressure rollers (U.S. Pat. No. 4,351,688 A) or whether the bearing discs are supported on pressure cylinders (US 2007/044922 A1), these pressure rings come with the disadvantage that the displaceable bearing of their pressure discs requires comparatively large diameters of the pressure rings, which has a disadvantageous effect not only on the pressing pressure that is exerted on the fiber tape, but also on the removal of the adhesive tape from the fiber layer of the fiber tapes.

SUMMARY OF THE INVENTION

The invention is thus based on the object of providing a deflection guide for the fiber tapes in an apparatus for laying fiber tapes, which deflection guide, under advantageous frictional conditions, allows good pressing of the fiber tapes against the already laid fiber layers on the one hand and secure removal of the adhesive tape from the fiber layer on the other hand, without giving rise to the likelihood that the fiber layer is partly lifted from the fiber structure again during the removal of the adhesive tape.

On the basis of an apparatus of the kind mentioned above, this object is achieved in accordance with the invention in such a way that pressure plates with rollers for deflecting the tape are provided between the pressure plates with a sliding surface for the deflection of the tape, and the retainers for the rollers which are arranged laterally on the pressure plates displaceably engage in the pressing direction in recesses of the pressure plates with the sliding surfaces.

Since through these measures it is not the rollers as such that are pressurized, but the pressure plates having the rollers for the deflection of the tape, there are no limitations concerning the bearing of the rollers so that rollers with a respectively small diameter can be used with the effect that the fiber tape can be applied with advantageous pressing pressure to the already laid fiber structure without impairing simple removal of the adhesive tape from the fiber layer. Despite the bearing of the rollers for the deflection of the tape via retainers that are provided to the side of the pressure plates, the width of the pressure plates provided with the rollers can remain limited to the width of the rollers because the retainers arranged laterally on the pressure plates displaceably engage in the pressing direction in recesses of the adjacent pressure plates with the sliding surfaces. The mutually independent pressurization of the pressure plates with and without rollers via a common membrane is thus ensured without having to provide a distance between the pressure plates. Although the pressure plates with the rollers between the pressure plates must be provided with a sliding surface for deflection of the tape, the frictional resistance between the deflection guide arranged in accordance with the invention and the fiber tapes is considerably reduced in comparison with known deflection guides pressure plates without rollers. Especially simple constructional conditions are obtained in this connection if the rollers are held on shafts held in retainers arranged laterally on the pressure plates.

If sliding shoes which are offset from the remaining plate body and are resilient in the pressing direction are formed by the recesses for accommodating the retainers, the additional advantage is obtained that said sliding shoes, in the case of a respective resilient pretensioning, are able to follow the respective surface shape of the already formed fiber structure irrespective of the individual pressurization of the pressure plates, thus providing especially advantageous pressing conditions for the fiber tape which is substantially independent of the local deformation properties of the membrane. A further graduation in the pressurization of the fiber tapes over their width can be achieved in such a way that the sliding shoes of the pressure plates are subdivided into sliding segments by slits parallel to the plane of the plates. The pressurization steps formed by the respectively pretensioned sliding segments allow a mutually independent pressurization of the fiber tape in the region of each sliding segment, thus providing especially favorable conditions for applying the fiber layers of the fiber tape to the already laid fiber layers.

An effect which is comparable to the resilient sliding shoes can be achieved for the rollers for the deflection guidance of the fiber tapes in such a way that the rollers arranged as grooved pulleys are held by radial contact on bearing receivers supported in the pressing direction in a resilient fashion against the retainers by means of continuous elastic endless belts which are guided about a bearing roller. As a result of the resiliently supported bearing receivers for the grooved pulleys, they can be pretensioned following a pressurization of the pressure plates via the resiliently supported bearing receivers, so that the grooved pulleys, within the scope of this pretensioning, are able to follow the already provided fiber structure independently from each other. The mutually laterally supported grooved pulleys are held in engagement with the bearing receiver by means of the endless elastic continuous belts, wherein the elastic expansion of said endless belts is necessary for permitting the displacements of the grooved pulleys in the pressing direction which is enabled by the pretensioned bearing receivers. The bearing receivers are held in a clamped fashion between the lateral retainers, which thus form an abutment for the spring elements of the bearing receivers.

As a result of the potential resilient pretensioning both of the sliding shoes of the one pressure plates and also the grooved pulleys of the other pressure plates, individual pressurization of the pressure plates can be omitted especially for thin fiber tapes, thus providing simple constructional conditions because the individual plates merely need to be combined in a non-displaceable manner in a frame, which is subjected to a respective pressure force for pretensioning the sliding shoes or the grooved pulleys.

In order to keep friction of the grooved pulleys in the bearing receivers at a low level, the bearing receivers may comprise rolling bodies which engage in the grooved pulleys.

BRIEF DESCRIPTION OF THE DRAWINGS

The subject matter of the invention is shown in the drawings by way of example, wherein:

FIG. 2 shows this apparatus in a sectional view along the line II-II of FIG. 1;

FIG. 3 shows a sectional view along the line III-III of FIG. 1 on an enlarged scale;

FIG. 6 shows a further embodiment of a pressure plate with rollers for the deflection of the tape in a partly sectional side view on an enlarged scale, and FIG. 7 shows the pressure plate according to FIG. 6 in a sectional view along the line VII-VII of FIG. 6.

DESCRIPTION OF THE PREFERRED EMBODIMENT

Figure 1:
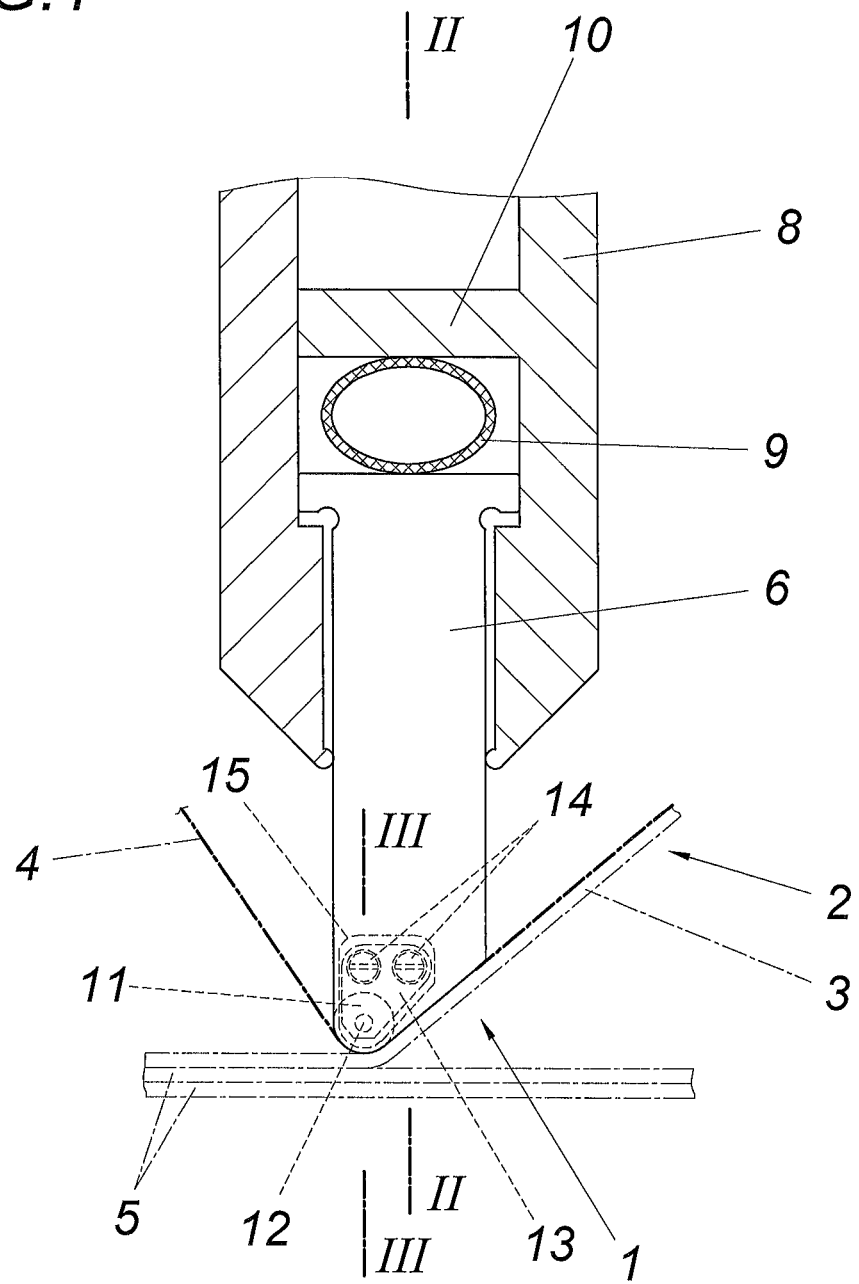
FIG. 1 shows sections of an apparatus in accordance with the invention in the region of the deflection guide for the fiber tapes in a simplified longitudinal sectional view.

In accordance with the embodiment according to FIGS. 1 to 3, the apparatus comprises a laying head with a deflection guide 1 for the fiber tapes 2 having an adhesive tape 4 carrying a fiber layer 3. Said fiber tapes 2 are drawn off a supply roll and pressed by means of the deflection guide 1 against the already laid fiber layers 5 of a fiber structure to be formed, wherein the adhesive tape 4 is drawn off the fiber layer 3 of the fiber tape 2, which occurs at a comparatively small deflection radius. The deflection guide 1 is composed of a plurality of pressure plates 6 and 7 which are arranged next to one of other perpendicularly to the deflection axis and which are displaceably guided in a frame 8 in the pressing direction and are pressurized by means of a membrane 9 together with a pressure medium. In order to achieve simple constructional conditions, the membrane 9 is formed in the embodiment by a pressure hose which rests as an abutment on the side of a frame wall 10 which is opposite of the pressure plates 6, 7.

When the membrane 9 is pressurized, the pressure plates 6, 7 are pressed against the already laid fiber layers 5, wherein the travel of the individual pressure plates 6, 7 depends on the shape of the surface of the already laid fiber layers 5 as a result of the flexibility of the membrane 9.

In order to reduce the frictional resistance between the adhesive tape 4 and the deflection guide 1 during the pressing of the fiber tape 2 against the already laid fiber layers 5, the plates 7 are provided with rollers 11 for the tape deflection. The arrangement is made in such a way that the rollers 11 are rotatably mounted on the shafts 12 which are held in lateral retainers 13. Said retainers 13 are laterally fixed to the pressure plates 7 via screws 14, as is shown in particular in FIG. 3. Since the retainers 13 which protrude laterally beyond that the pressure plate 7 engage in lateral recesses 15 of the pressure plates 6 that accommodate the pressure plate 7 between themselves, which occurs with a displacement play in the pressing direction, the pressure plates 6, 7 can form a deflection surface for the fiber tape 2 which is substantially closed in the direction of the widths of the tape, without having to make do without a mutually independent displacement in the pressing direction. The deflection surface for the fiber tapes 2 are formed via the sliding surfaces 16 of the pressure plates 6 on the one hand and by the rollers 11 on the other hand, whose radius corresponds to the radius of curvature of the sliding surfaces 16 and can be kept sufficiently small by taking the respective requirements into account since there are hardly any constructional limitations concerning the roller diameter.

Figure 5:
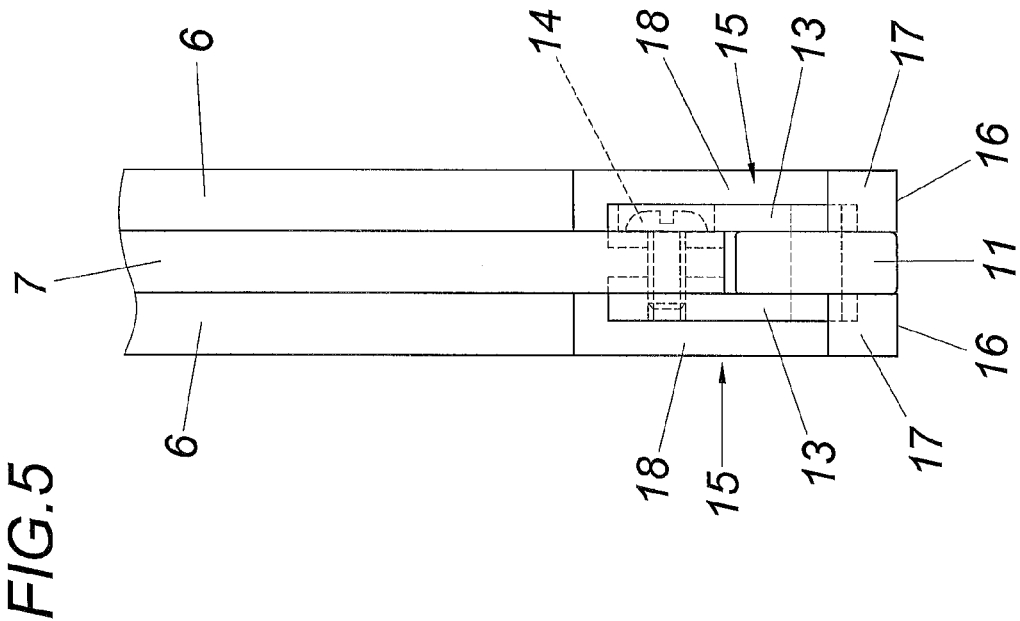
FIG. 5 shows the pressure plates according to FIG. 4 in a front view.
Figure 4:
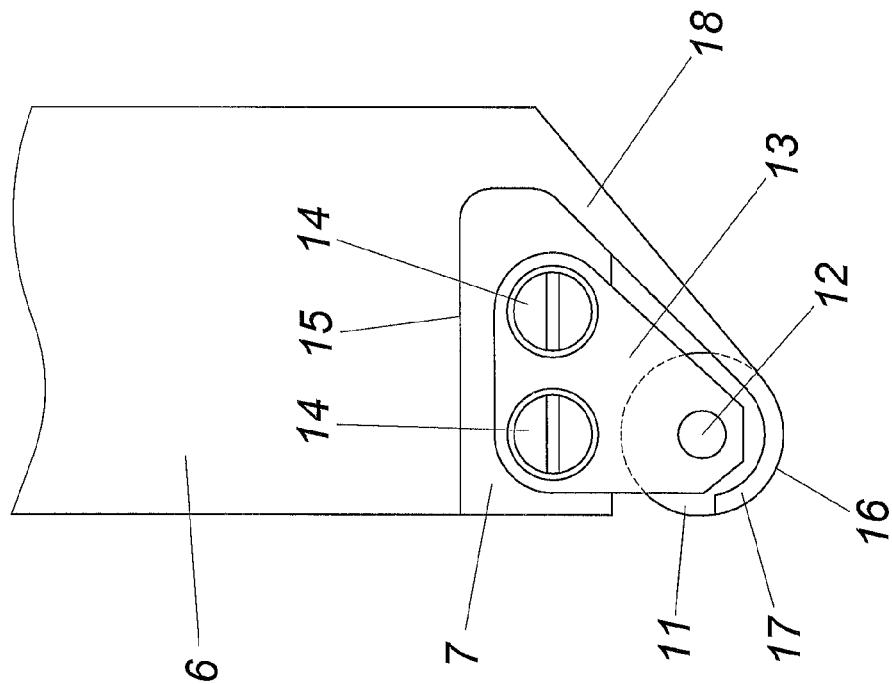
FIG. 4 shows an embodiment of the pressure plates in a side view in sections in the region of the rollers for the deflection of the tape.

As is shown by the configuration of the pressure plates 6 according to the embodiment according to FIGS. 4 and 5, the recesses 15 for accommodating the retainers 13 for the shafts 12 of the rollers 11 can also be used for forming a sliding shoe 17 which is separate from the remaining plate body, which sliding shoe is connected via the remaining web 18 to the remaining plate body in such a way that the sliding shoe 17 is resiliently supported in the pressing direction. Said resilient support of the sliding shoe 17 allows an additional adjustment of the sliding shoe 17 to the surface progression of the already laid fiber structure, irrespective of the pressurization position of the pressure plates 6 via the membrane 9. FIG. 5 shows that the pressure plates 7, in contrast to the embodiment according to FIGS. 1 to 3, can be equipped with only one roller 11 for the deflection of the tape, so that the pressure plates 6 and 7 are provided with the same thickness.

An embodiment is shown in FIGS. 6 and 7, by means of which a stepped pressurization is enabled in the region of the individual pressure plates 6, 7 in order to allow pressing the fiber tape 2 in smaller steps to the already laid fiber layers 5. For this purpose, the pressure plates 7 are provided with several rollers 11 in form of grooved pulleys, which rest on each other and are axially guided between the pressure plates 6. Said grooved pulleys engage in bearing receivers 19 which are provided with rolling bodies 20 which guide the grooved pulleys via their grooves. For the purpose of radial fixing within the bearing receivers 19, the grooved pulleys are supported via an elastic endless belt 21 in relation to a bearing roller 22, which is mounted in the lateral retainers 13 of the pressure disks 7, so that the grooved pulleys, which are guided between the plates 6, are held in the radial direction in engagement with the bearing receivers 19 via the elastic endless belt 21 and the bearing roller 22 as the abutment. The bearing receivers 19 are resiliently supported in the pressing direction in relation to the retainers 13 via respective spring elements 23. This means that in the case of a pressurization of the pressure plates 7 via the membrane 9 the rollers 11 in form of the grooved pulleys are pressed against the fiber structure under resilient pretensioning of the spring elements 23. The individual grooved pulleys can be displaced independently from each other in the pressing direction within the scope of the pretensioning of the respectively associated spring elements 23, which allows a finely graduated adjustment of the deflection guide 1 to the surface progression of the already laid fiber structure.

Similarly, the sliding shoes 17 of the pressure plates 6 can be subdivided into mutually independent, spring-loaded sliding segments 25 by slits 24 which are parallel to the plane of the plates, as is shown in FIG. 7. A finely graduated adjustment of the sliding shoes 17 along the surface of the fiber structure is thus also enabled in the region of the pressure plates 6.

Since in the case of a respectively resilient support the sliding shoes 17 of the pressure plates 6 and the rollers 11 of the pressure plate 7 are each able to follow the surface contour of the already laid fiber layers 5 in a resilient fashion in the case of a respective pretensioning, which occurs in the case of a respective pretensioning irrespective of individual pressurization of the pressure plate 6, 7, the individual pressurization of the pressure plate 6, 7 can be omitted in such a case, which leads to considerable simplifications in the construction. The pressure plates 6, 7 merely need to be clamped in the frame 8 in a non-displaceable manner in order to press the frame with a respective force against the already laid fiber structure in order to ensure the required pretensioning of the resilient sliding shoes 17 and the resilient rollers 11.

What is claimed is:

1. An apparatus for laying fiber tapes, comprising a deflection guide (1) for the fiber tapes (2) comprising pressure plates (6) arranged adjacent to one another transversely to the deflection axis and a frame (8) for receiving the pressure plates (6) which is displaceable in the laying direction, wherein pressure plates (7) with rollers (11) for deflecting the tape are provided between the pressure plates (6) with a sliding surface (16) for the deflection of the tape, and the retainers (13) for the rollers (11), which retainers are arranged laterally on the pressure plates (7), displaceably engage in the pressing direction in recesses (15) of the pressure plates (6) with the sliding surfaces (16).

2. The apparatus according to claim 1, wherein the rollers (11) of the pressure plates (7) are mounted on shafts (12) held in lateral retainers (13).

3. The apparatus according to claim 1, wherein the pressure plates (6) form sliding shoes (17) which are resilient in the pressing direction and are separated by recesses (15) from the remaining plate body.

4. The apparatus according to claim 3, wherein the sliding shoes (17) of the pressure plates (6) are subdivided into sliding segments (15) which are parallel to the plane of the plates and are resilient independently from each other.

5. The apparatus according to claim 1, wherein the rollers (11) arranged as grooved pulleys are held in radial contact on bearing receivers (19) by means of elastic endless belts (21) guided about a bearing roller (22), which bearing receivers are supported in the pressing direction in a resilient fashion against the retainers (13).

6. The apparatus according to claim 5, wherein the bearing receivers (19) comprise rolling bodies (20) engaging in the grooved pulleys.

\* \* \* \* \*